Figure 1:
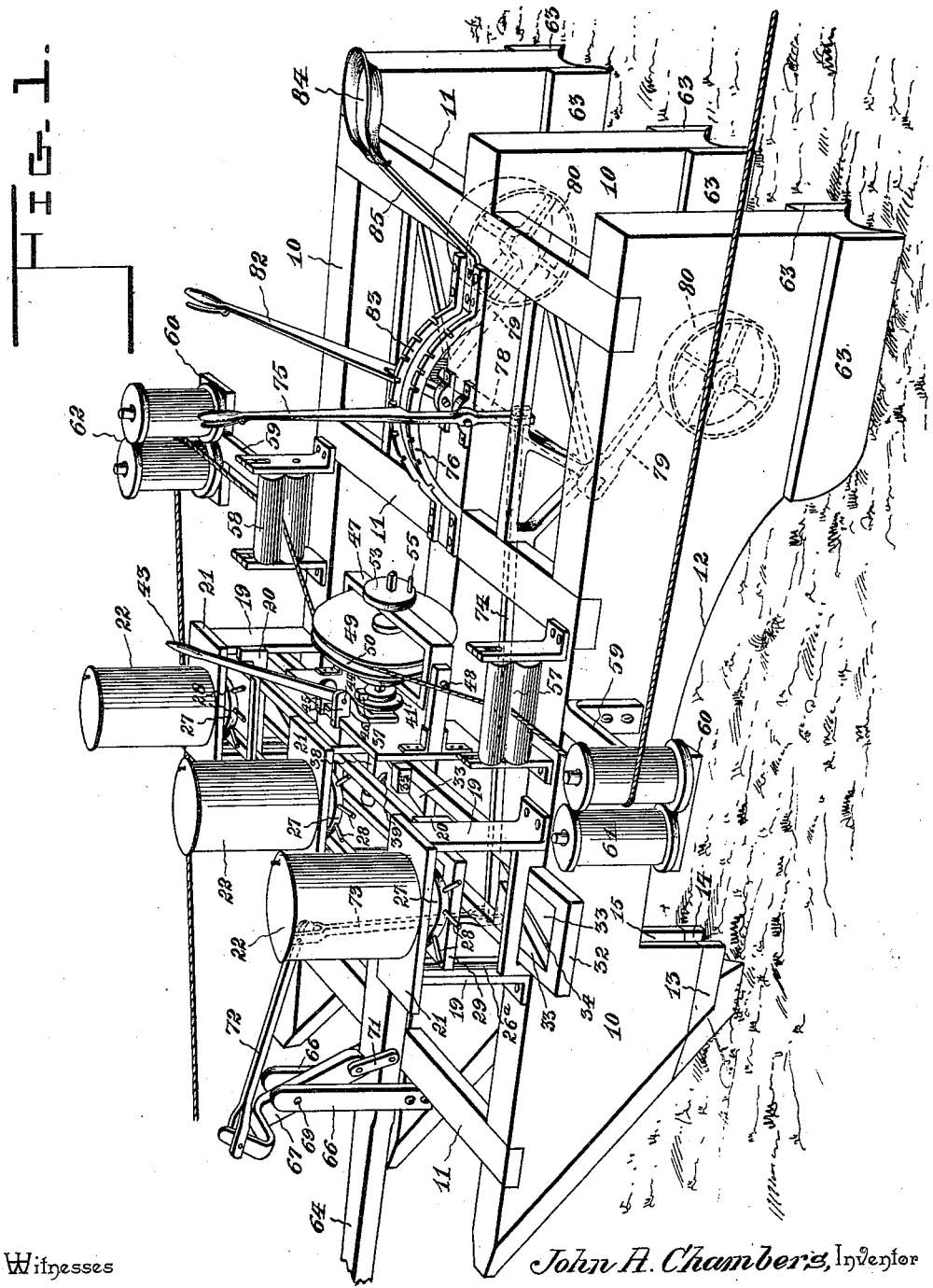

No. 659,646. Patented Oct. 16, 1900.
J. A. CHAMBERS.
CORN PLANTER.
(Application filed Jan. 10, 1900.)

(No Model.) 3 Sheets—Sheet 1.

Witnesses John A. Chambers, Inventor
By his Attorneys,
C. A. Snow & Co.

No. 659,646. Patented Oct. 16, 1900.
J. A. CHAMBERS.
CORN PLANTER.
(Application filed Jan. 10, 1900.)
(No Model.) 3 Sheets—Sheet 2.
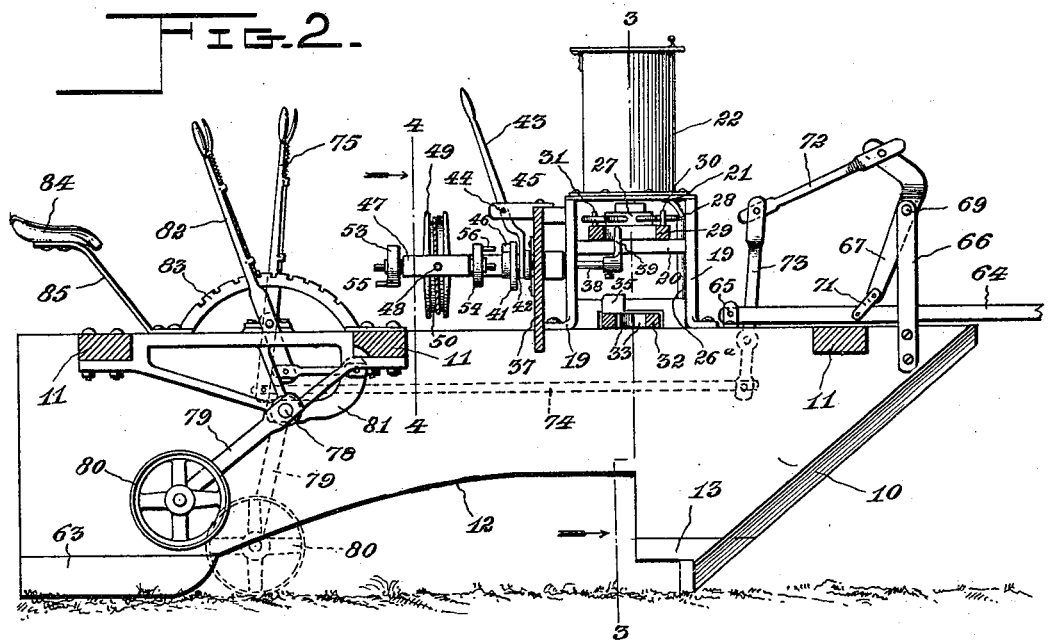
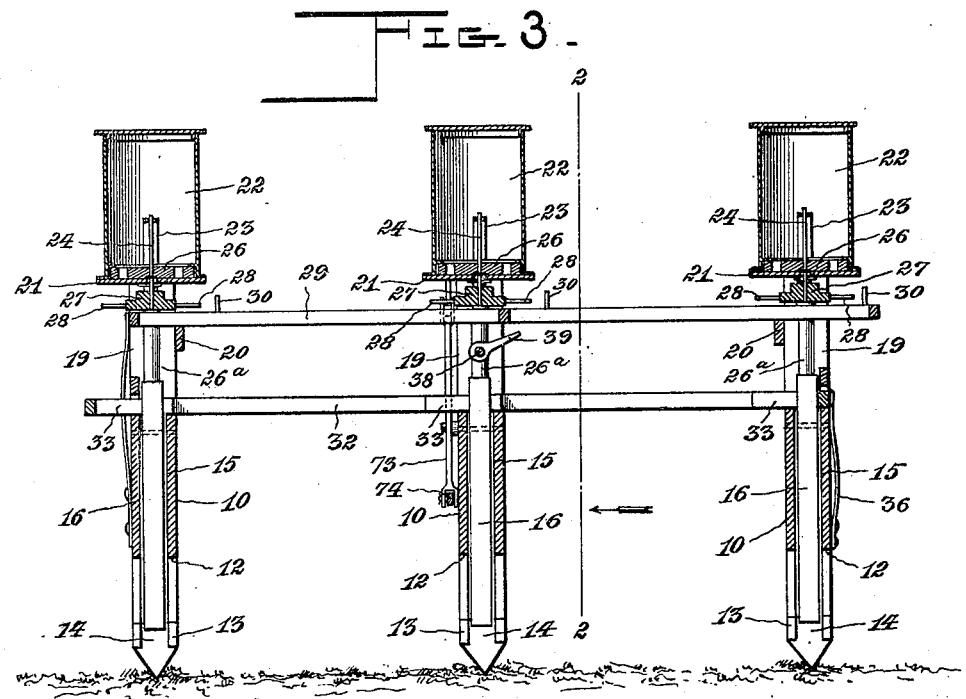
Witnesses  John A. Chambers, Inventor No. 659,646. Patented Oct. 16, 1900.
J. A. CHAMBERS.
CORN PLANTER.
(Application filed Jan. 10, 1900.)
(No Model.) 3 Sheets—Sheet 3.
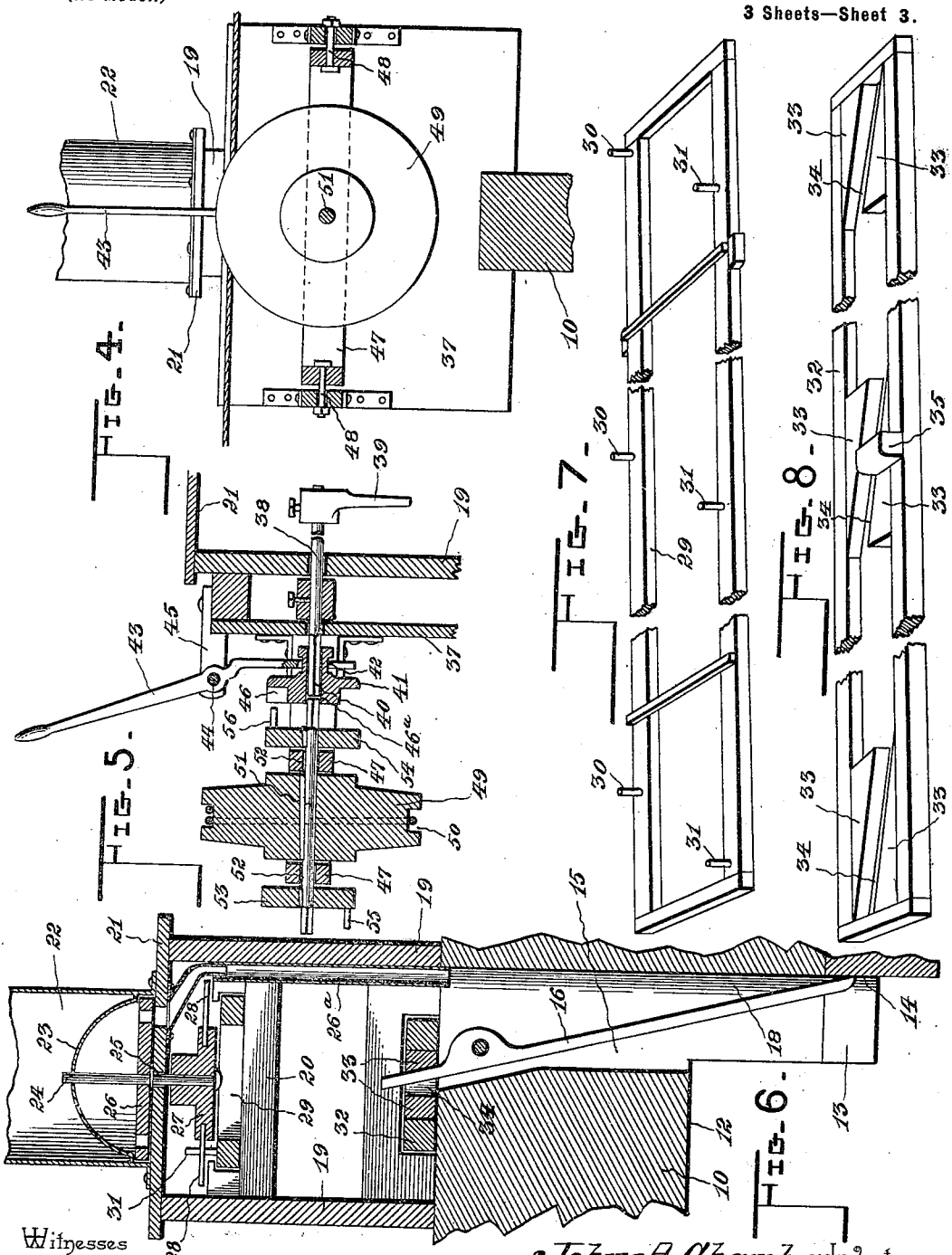

UNITED STATES PATENT OFFICE.

JOHN A. CHAMBERS, OF NEWBURG, MISSOURI.

CORN-PLANTER.

SPECIFICATION forming part of Letters Patent No. 659,646, dated October 16, 1900.

Application filed January 10, 1900. Serial No. 941. (No model.)

*To all whom it may concern:*

Be it known that I, JOHN A. CHAMBERS, a citizen of the United States, residing at Newburg, in the county of Phelps and State of Missouri, have invented a new and useful Corn-Planter, of which the following is a specification.

My invention relates to corn-planters of that class which are known to the art as "check-row" planters; and one object in view is to provide an improved construction of the check-wire spool or reel which enables me to use a smooth wire free from buttons or projections and which reel may be reversed at the end of the row, so that the mechanism may be operated on the back-and-forth trips of the machine across the field.

A further object of the invention is to provide an operating mechanism which may be thrown out of service at any time without arresting the progress of the machine or displacing the check-wire from the spool or reel, and with this operating mechanism is associated guide and tension rollers that direct and strain the check-wire.

A further object is to provide means by which the machine may be easily turned at the end of the row by lifting the runners and covering-shovels above the ground.

A further object is to provide a duplex dropper mechanism which is controlled from a single operating mechanism and is adapted to regulate the passage of the corn from a number of hoppers to corresponding valve devices, the latter being opened automatically to deposit the grain in the ground.

With these ends in view the invention consists in the novel combination of elements and in the construction and arrangement of parts which will be hereinafter described and claimed.

To enable others to understand the invention, I have illustrated the preferred embodiment thereof in the accompanying drawings, forming part of this specification, and in which—

Figure 1 is a perspective view of a corn-planter embodying my invention. Fig. 2 is a vertical longitudinal sectional elevation taken from front to rear of the machine and on the plane indicated by the dotted line 2 2 of Fig. 3. Fig. 3 is a vertical transverse sectional view through the dropper mechanism on the plane indicated by the dotted line 3 3 of Fig. 2. Fig. 4 is another vertical transverse section through the machine in rear of the operating mechanism and the check-wire spool or reel, the plane of section being indicated by the dotted line 4 4 of Fig. 2. Fig. 5 is an enlarged detail view through the operating mechanism. Fig. 6 is an enlarged detail section through one of the hoppers, the dropping-disk, the valve, and the parts associated therewith. Fig. 7 is a detail perspective view of the upper dropper-slide. Fig. 8 is a like view of the lower valve-slide.

The same numerals of reference are used to indicate like and corresponding parts in each of the several figures of the drawings.

The framework of my improved corn-planter consists of a series of runners 10 and a series of cross-rails 11, all of which parts are joined firmly together in any suitable way to produce a substantial rigid structure.

In the drawings I have represented the planter as provided with a series of three runners arranged parallel to each other and at the proper distances apart; but I do not desire to confine myself to the employment of three runners, because I am aware that the number of the runners may be increased to five if it is desired to increase the capacity of the machine. Each runner of the series is provided in its lower edge with a cut-out portion or recess 12, and this formation of the runner produces a pointed shoe 13 at the front end thereof, the shoes on the series of runners lying in the same vertical plane transversely across the machine. The shoes 13 of the runners are provided in their rear sides with the grooves or channels 14, and in the runners are produced or provided the vertical seed-passages 15, which are adapted to receive the valve-levers 16, the valve-levers lying in the same vertical plane across the machine. Each valve-lever is fulcrumed at a point intermediate its length within the seed-passage 15 of the runner, and the lower end of said lever is arranged to impinge against the front wall of the seed-passage 15 in order that the passage and the lever may produce a seed-pocket 18 within the runner. It will be understood that the grain from the dropper mechanism associated with the hoppers is delivered to the seed-passages 15 and caught or retained by the seed-pockets 18, formed within said passages by the position of the valve-lever 16 therein, and these valve-levers are operated simultaneously at a proper time to release the grain in the seed-pockets and permit the same to travel down the channels or grooves 14 and be deposited into the furrow opened by the runners.

On the runners 10, near the front end of the machine, I provide a series of standards 19, which are arranged in pairs and disposed in alinement with each other across the machine-frame. Each pair of standards 19 is provided with one or more cross-rails 20 and with a cap-rail 21. The cross-rails 20 of the series of standards are disposed in the same horizontal plane to accommodate the reciprocating dropper-slide, presently referred to, and in like manner the series of cap-rails 21 are disposed in the same horizontal plane in order to support the series of seedboxes 22, which are secured firmly to the cap-rails 21. The seedboxes 22 are provided with yokes 23, each of which is secured removably in place within the seedbox in any suitable way. The cap-rails 21 of the standards are provided with journal-bearings 25, disposed in the vertical plane of the axes of the seedboxes, and in these bearings are mounted the vertical dropper-shafts 24, the upper ends of which are extended into or through the yokes 23 of the seedboxes, while the lower ends of said shafts protrude below the cap-rails 21 and terminate contiguous to the plane of the dropper-slide. Said vertical shafts are provided with the dropper-disks 26, which are disposed within the seed-hoppers, and said disks are provided with grain openings or pockets, each of which receives a desired number of grains of corn from the hopper and is adapted on the rotation of the disk to deliver the grains to the seed-tubes 26ᵃ; the latter being supported within the pair of standards 19 and extending to the seed-passages 15 of the runners. The lower ends of the vertical shafts 24 carry the tappet-wheels 27, which are keyed or otherwise fastened to said shafts, and each tappet-wheel is provided with a series of radial fingers 28, which lie in the path of tappet pins or studs on the dropper-slide 29. This dropper-slide is arranged in a horizontal position across the machine in a plane below the tappet-wheels, and said dropper-slide is confined between the pairs of standards 19 and rests upon the cross-rails 20 of said standards, whereby the dropper-slide is supported in operative relation to the series of tappet-wheels and is free to reciprocate across the machine for the proper operation of the dropper devices. The reciprocating dropper-slide 29 is preferably of skeleton construction to reduce its weight and insure easy movement thereto, and this slide is provided with means by which it is made to actuate the series of tappet-wheels 27 of the entire series of dropping-disks 26, whereby all the dropping devices are actuated from a single slide.

The actuating devices on the dropper-slide for the tappet-wheels consist of a plurality of studs or pins 30 31, which are disposed or grouped in pairs, one pair of studs 30 31 being provided for each tappet-wheel 27. The stud 30 for each tappet-wheel is disposed on one side of the dropper-slide and in a position at one side of the vertical shaft 24, while the other stud 31 lies on the opposite side of the dropper-slide and also on the opposite side of the vertical shaft from the stud 30. This disposition of the pair of studs for each tappet-wheel insures the impingement of the studs against the fingers of the wheel on the reciprocating play of the dropper-slide in either direction—that is to say, when the dropper-slide is moved to the left the stud 30 impinges against one of the fingers of the tappet-wheel to move the latter and the dropper-disk a proper distance to bring one of the pockets or openings in said dropper-disk 26 into coincidence with the seed-tube 26ᵃ. On the reverse stroke or movement of the slide the stud 31 acts in like manner against one of the fingers on the tappet-wheel, thereby imparting movement to the tappet-wheel and the dropper-disk in the same direction and causing the last-named disk to again deliver seed to the tube 26ᵃ. It will be understood that the movement of the dropper-slide in one direction causes the studs 30 to act on all the tappet-wheels for the operation of the dropper-disks 26 to deliver grain to the series of tubes that discharge to the seed-passages 15, and these parts are actuated in like manner on the reverse movement of the slide for the studs 31 to impinge against the tappet-wheels.

The means for operating the valve-lever 16 within the runners are embodied in the form of a slide 32, which is arranged in a horizontal position some distance below and in the vertical plane of the dropper-slide 29. This valve-slide 32 is arranged to rest on or to be supported by the runners 10, and said valve-slide is provided with pairs of cam-blocks 33, each pair of cam-blocks being provided or formed on the valve-slide at a point over the runner, so as to form a cam-slot 34 for the reception of the upper end of one of the valve-levers. The series of cam-slots 34 within the skeletonized valve-slide are disposed in oblique positions to the axis of said slide 32, and this slide is arranged to be confined by suitable guide devices against sidewise movement between the standards 19, whereby the valve-slide is caused to travel endwise in a direct line and its cam-slots 34 are made to vibrate the valve-levers 16 on their fulcra for the opening and closing of the pockets 18 in the passages 15. The reciprocating valve-slide 32 is provided at or near its middle with an upwardly-projecting stud which is disposed in the path of the tappet-shaft, and said valve-slide is pressed normally in one direction by means of a spring 36. In the drawings this spring is shown in the form of a leaf-spring fastened to one of the runners and acting against one end of the slide to impel it in a direction for the ends of the valve-levers to fit in one end of the cam-slots of said slide, and this spring acts in opposition to the tappet-shaft, whereby the shaft is adapted to force the slide in one direction and the spring impels the slide in the opposite direction. The detailed construction of the spring and its relation to the slide, however, may be varied by a skilled mechanic.

For the proper support of the operating mechanism for the check-wire I provide a frame 37 on the central runner and arrange said frame in rear of the middle dropper devices. In a suitable bearing of this frame is journaled a tappet-shaft 38, which lies in a horizontal position between the dropper-slide 29 and the valve-slide 32. The front end of this tappet-shaft is provided with an arm which is keyed on the shaft to rotate therewith, and during each rotation of this shaft the arm 39 acts against the dropper-slide 29 and the stud 35 on the valve-slide 32, thus positively reciprocating both slides from a single tappet-shaft. The arm of the tappet-shaft positively impels the dropper-slide and the valve-slide in one direction, said arm acting alternately on said slides; but the dropper-slide may be returned to its normal position after the tappet-arm clears the same by a spring similar to the spring 36, which acts on the valve-slide. The end of the tappet-shaft opposite to that end on which the tappet-arm 39 is secured protrudes beyond the bearing in the frame 37, and said end of the shaft is made square or polygonal, as at 40, to receive a rotary and shiftable clutch-disk 41. This clutch-disk has a central opening which conforms to the contour of the end 40 of the shaft, and the disk is thus made to rotate with the shaft; but at the same time it is free to be shifted lengthwise of the shaft in order to position the disk into or out of operative relation to the devices actuated by the check-wire spool or reel. Said disk is provided at its front end with a grooved hub 42, with which engages the forked end of a shipping-lever 43, fulcrumed on a pin 44, supported in lugs 45 of the frame 37. The disk 41 is furthermore provided with a grooved face, from which protrudes a radial flange 46, and, furthermore, the disk has a central opening 46ª, adapted to receive one end of a shaft for the check-wire spool or reel. In the rear end or part of the fixed frame 37 on the central runner is supported a reversible spool-frame 47, which normally occupies a horizontal position above the central runner, and this reversible frame is pivotally supported at its ends on the frame 37 by means of the horizontal pivots 48, which lie at right angles to the central runner 10. This reversible frame carries the check-wire spool or reel 49, having an annular groove 50, in which the check-wire is coiled one or more times, and said spool or reel is secured fast with the spool-shaft 51, which is journaled in bearings 52 on the said rails of the reversible spool-frame 47. The ends of the spool-shaft are prolonged beyond the bearings 52, and to said ends of the shaft are secured the clutch-disks 53 54, which are disposed on opposite sides of the spool-frame and are adapted to rotate with the spool-shaft.

The disk 53 on one end of the spool-shaft is provided with a radial stud 55, while the other disk 54 on the opposite end of said spool-shaft is provided with a like stud 56, and the reversible spool-frame is pivoted or supported at such a distance from the disk 41 that the stud on one of the disks of the spool-shaft may engage with the radial flange 46 of said disk 41, whereby the spool-shaft and the tappet-shaft may be connected operatively together by the engagement of the clutch-disk 41 with a similar clutch-disk 53 or 54, according to the position of the spool-frame. It will be understood that the clutch-disk 41 may be operated by the lever 43 to retract the radial flange 46 from the path of the stud on the disk of the spool-shaft, thus uncoupling the disks and disconnecting the tappet and spool shafts. In this position of the parts the spool-frame and the check-wire spool or reel may be reversed when the machine reaches the end of a furrow, and the reversal of the spool-frame and the reel or spool therein presents the clutch-disk on the other end of the spool-shaft in position, where it may engage with the shiftable clutch-disk 41. Said shiftable clutch-disk may now be operated to engage its radial flange with the stud on the disk of the spool-shaft which has just been brought into position, and the tappet and spool shafts may thereby be connected operatively together for the motion of the spool-shaft to be transmitted to the tappet-shaft for the operation of the dropper and valve slides. This reversal of the check-wire spool or reel is an important feature of my invention, because it enables the machine to be driven back and forth across the field without twisting the check-wire, and it insures the operation of the tappet-shaft and the dropper mechanism under the different conditions for service of the machine in the field.

The check-wire is led or guided through the sets of direction or guide rolls, which prevent twisting of the wire and guide it in a straight line directly across the machine, so that the wire may be properly coiled around the grooved periphery of the spool or drum. Two sets of horizontal rolls 57 58 are provided on the sides of the machine and they are disposed on opposite sides of the check-wire spool or reel 49. The lower rolls are journaled in place in any suitable way; but the upper rolls should be slidably or yieldably supported and be made quite heavy in order that they may press upon the check-wire and coact with the lower rolls to grip and exert tension on the check-wire, thus preventing the strand of the check-wire between the two sets of rolls from kinking within the limits of the corn-planter. Horizontal arms 59 are secured rigidly to the side runners of the machine-frame and project outwardly therefrom. Said arms carry upright yokes or frames 60, and in these yokes or frames are journaled the two sets of vertically-disposed direction-rolls 61 62. These direction-rolls are supported on the machine-frame in the vertical plane of the horizontal guide-rolls transversely across the machine, and said direction-rolls insure the proper guidance of the check-wire to the horizontal rolls to strain the check-wire around the spool or reel.

The runners 10 of the machine are provided at their rear ends and on their lower edges with the shoes 63. A pair of these shoes are secured to each runner, on the opposite sides thereof, in any suitable way, and the inner opposing-faces of the shoes are beveled or inclined in opposite directions to make the shoes press the soil inwardly toward the central line of the furrow and cover the grain deposited by the runners in said furrow.

The planter is intended to be drawn across the field by a team hitched to the draft-tongue 64, disposed in the plane of the central runner and having its rear end extending over said runner. This rear end of the tongue is connected pivotally to the runner, as at 65, and said tongue is fitted slidably between a pair of guide-posts 66, which are fastened to the front end of the runner. This pivoted tongue is adapted to be raised or lowered on its pivotal connection with the runner by suitable devices under the control of the driver seated on the machine. These devices consists of a lever 67, which is fulcrumed at 69 to the posts 66, and the upper end of said lever is offset laterally in order to properly connect with a link to an idle lever 73. The lower end of the lever 67 terminates immediately above the draft-tongue, and to said tongue and lever are pivoted the links 71, which operatively connect the lever and tongue together. The upper offset end of the lever is pivoted to a link 72, having its opposite end pivoted to an idle lever 73. A pitman 74 is connected to the lower end of this idle lever, and said pitman extends alongside of the central runner to have its rear end pivoted to a hand-lever 75, the latter being fulcrumed on the central runner and provided with a suitable hand-latch adapted to engage with a segment 76, fixed on the rear part of the central runner. The front end of the tongue being supported by the usual neck-yoke connected to the collars of the team by the neck-straps of the harness, the lever 72 and the connections between it and the tongue serve to permit the raising and lowering of the front end of the planter.

When the front end of the planter is raised from the ground and the rear portion thereof supported by the ground-wheels hereinafter described, the entire frame and operating parts of the planter are out of contact with the earth, and the planter can then be driven from place to place or turned in a field at the end of a row.

The short axle 78 is arranged transversely across the central runner and is mounted in suitable bearings on the frame of the machine, and to the ends of this axle are secured arms 79, provided with suitable spindles for the accommodation of the ground-wheels 80. The axle 78 is provided at a point intermediate its length with a crank-arm 81, to which is pivoted a hand-lever 82, fulcrumed on the machine-frame and carrying a latch adapted to engage with a segment 83, which is fixed to the central runner. The driver may occupy the seat 84, which is attached to a standard 85, that is mounted on the runner in a position for the driver to reach the hand-levers 75 82.

The ends of the check-wire are fastened to suitable anchoring devices in the field, and said wire is led through the four sets of direction-rolls and coiled around the spool or reel on the corn-planter. I prefer to provide the anchoring devices with means for taking up the slack in the check-wire; but as these anchoring devices form no part of the present invention and as they may be of any well-known or preferred construction I have not considered it necessary to illustrate the same. As the machine is advanced the frictional engagement of the check-wire with the spool or reel operates to rotate the latter, and through the clutch mechanism the tappet-shaft is driven for its arm to operate against the slides 29 32 alternately. The action of the tappet-arm against the slide 29 reciprocates the latter and causes its studs to rotate the tappet-wheels on the vertical shafts and turn the dropper-disks 26 with a step-by-step motion, thus delivering the grain in regulated quantities to the seed-tubes, which deposit said grain in the pockets of the runners. The action of the tappet-arm on the valve-slide moves the latter in a direction for its cam-slots to engage with the levers 16 to open the latter and drop the seed in the furrows which are opened by the runners, the seed being covered by the soil pressed inwardly by the action of the shoes 63 on said runners. The dropper and valve slides are actuated at regular intervals by the rotation of the tappet-shaft and the corn is deposited at regular intervals in the furrows. When the machine reaches the end of the field, the operator should move the lever 43 to disengage the clutch-disk 41 from one disk on the spool-shaft, after which the spool-frame may be reversed in its bearings to present the other clutch-disk in the position for engagement with the disk 51 on the tappet-shaft. The machine must be turned at the end of the field, and this is effected by moving the lever 82 in a direction to rock the axle 78 and lower the ground-wheels 80. This adjustment of the axle and the wheels thereon raises the rear end of the frame for the runners and the shoes 63 to clear the ground, and the axle is fastened in its adjusted position by the engagement of the latch on the hand-lever 82 with the segment 83. The operator should now adjust the hand-lever 75 to depress the pivoted tongue 64 upon the central runner, and the lever 75 is locked in its adjusted position by the engagement of its latch with the segment 76. It will thus be seen that the rear end of the frame is sustained by the crank-axle and that the weight of the machine is thrown well forward by the depression of the tongue, thus permitting the machine to be turned at the end of the field, because the pointed shoes 13 of the runners will offer but slight resistance to the movement of the machine. The team is driven to make the machine assume a proper position for the next trip, and the levers 75 82 are operated to lower the machine and raise the wheeled axle. The spool-frame having been reversed, the lever 43 is adjusted to move the clutch-disk 41 into a position where the end of the spool-shaft 51 enters the opening 46$^a$ in the clutch-disk 41 and the stud on the clutch-disk of the spool-shaft engages with the flange 46 on the clutch-disk 41, thereby coupling the spool-shaft and the tappet-shaft. The parts are now in position for operation of the dropper and valve mechanism as the machine is drawn in the opposite direction across the field.

Changes in the form, proportion, size, and the minor details of construction within the scope of the appended claims may be resorted to without departing from the spirit or sacrificing any of the advantages of this invention.

What I claim is—

1. In a check-row corn-planter, the combination with a dropper mechanism, and a shaft to actuate said mechanism, of a check-wire spool or drum, means for reversing said check-wire spool, and clutch devices between the spool-shaft and the operating-shaft, substantially as described.

2. In a check-row corn-planter, the combination with a dropper mechanism, and a tappet-shaft in active relation to said dropper mechanism, of a reversible check-wire spool or reel, and clutch mechanism between the spool-shaft and the tappet-shaft, substantially as described.

3. In a check-row corn-planter, the combination with a dropper mechanism, and a tappet-shaft, of a reversible spool-frame contiguous to said shaft, a revoluble spool or reel journaled in said reversible frame and provided with clutch members adapted to be presented in operative relation to the tappet-shaft, and another clutch member on said tappet-shaft for engagement with either of the clutch members on the spool-shaft, substantially as described.

4. In a check-row corn-planter, the combination with a dropper mechanism, and a tappet-shaft, of a pivoted reversible spool-frame, a spool or reel having its shaft journaled in said frame and reversible therewith, clutch members fast with the respective ends of the spool-shaft and adapted to be presented successively into active relation with the tappet-shaft, and a shiftable clutch member on the tappet-shaft and arranged to engage with either of the clutch members on the spool-shaft, substantially as described.

5. In a check-row corn-planter, the combination with a dropper mechanism, of a tappet-shaft in active relation to said dropper mechanism, a spool or reel having its shaft provided with a clutch member, another clutch member slidably fitted on the tappet-shaft and adapted to engage with the clutch member on the spool-shaft, and a lever connected with the slidable clutch member to move the same into or out of engagement with the spool-shaft, substantially as described.

6. In a check-row corn-planter, the combination with a reel or spool, of a tappet-shaft actively connected with the spool-shaft, a series of dropper-shafts provided with a series of tappet-wheels, and a dropper-slide in active relation to the tappet-shaft and provided with means to operate the tappet-wheels simultaneously at each stroke of said slide, substantially as described.

7. In a check-row corn-planter, the combination with a series of hoppers having the dropper-shafts and disks, and a check-wire reel or spool, of a tappet-shaft connected operatively with said spool or reel and provided with an arm, a dropper-slide disposed in the path of the arm on the tappet-shaft, a tappet-wheel secured to each of the dropper-shafts and arranged contiguous to the dropper-slide, and a pair of studs for each tappet-wheel and secured to the dropper-slide to act against the tappet-wheel on each stroke of said slide, substantially as described.

8. In a check-row corn-planter, the combination with a dropper mechanism, and a valve mechanism, of a dropper-slide in active relation to the members of the dropper mechanism, a valve-slide connected with the valves of said valve mechanism, a tappet-shaft arranged between the dropper and valve slides and having means for acting alternately thereon, and a check-wire spool or reel connected with the tappet-shaft, substantially as described.

9. In a check-row corn-planter, the combination with a dropper mechanism, of the valve-levers, a cam-slotted valve-slide engaging with said valve-levers, a tappet-shaft adapted to operate said valve-slide, and a check-wire spool or reel connected with said tappet-shaft, substantially as described.

10. In a check-row corn-planter, the combination with a dropper mechanism and runners, of a valve-slide provided with cam-slots, a series of valve-levers fitted to said runners and engaging with the cam-slots in said slide, a tappet-shaft having an arm arranged to ride upon a projection on the valve-slide, means for guiding the said valve-slide to insure reciprocation thereof in a rectilinear path, a spring acting on the valve-slide in opposition to the impulses given thereto by the tappet-shaft, and means for rotating said tappet-shaft, substantially as described.

11. In a check-row corn-planter, the combination with a frame having shoes at its front end, of a tongue pivoted to said frame, a lever connected with said tongue and having means for locking the tongue in a depressed position, and a wheeled axle mounted on said frame and adapted to be locked in its depressed position, whereby the frame may be raised at its rear end and the weight of the frame be thrown upon the shoes, for the purpose described, substantially as set forth.

12. In a check-row corn-planter, the combination of the connected runners having the shoes, a tongue pivoted on said frame, an operating-lever mounted on the frame and having means for locking the same in its adjusted position, a train of connections from said lever to the pivoted tongue for holding the latter in a fixed depressed condition, a cranked axle connected to the rear part of the machine and provided with the ground-wheels, and a lever mounted on the machine and connected with said cranked axle to depress the wheels thereof and raise the rear part of the machine, substantially as described.

13. In a check-row corn-planter, the combination of the connected runners having the pointed shoes near their front ends, a draft-tongue pivoted on the central runner, a hand-lever fulcrumed on the frame near its rear end and having a link connected thereto, a lever supported on the machine over the tongue and linked thereto, an idle lever connected with the tongue-lever and the hand-lever, a cranked axle supported on the machine near its rear end and provided with the ground-wheels, and a lever connected with the cranked axle and having means for locking the same in place, substantially as described.

14. In a check-row corn-planter, the runners provided with the shoes, the vertical seed-passages and grooves in said shoes and arranged to register with said seed-passages, combined with the valve-levers pivoted within the seed-passages and arranged to form pockets therein, a cam-slotted valve-slide fitted to said valve-levers, a spring acting against said slide, means for directing the slide to rectilinear reciprocating play with relation to the levers, and means for reciprocating the slide positively, substantially as described.

In testimony that I claim the foregoing as my own I have hereto affixed my signature in the presence of two witnesses.

JNO. A. CHAMBERS.

Witnesses:
CHARLEY RAY,
CLAUD MOORE.